(12) United States Patent
Umehara et al.

(10) Patent No.: US 11,204,263 B2
(45) Date of Patent: *Dec. 21, 2021

(54) POSITION DETECTION DEVICE FOR DETECTING POSITION OF AN OBJECT MOVING IN A PREDETERMINED DIRECTION, AND A MAGNETIC SENSOR FOR USE WITH THE POSITION DETECTION DEVICE

(71) Applicant: TDK CORPORATION, Tokyo (JP)

(72) Inventors: Tsuyoshi Umehara, Tokyo (JP); Keisuke Uchida, Tokyo (JP); Toshihide Suto, Tokyo (JP); Hiraku Hirabayashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/896,379

(22) Filed: Jun. 9, 2020

(65) Prior Publication Data

US 2020/0300669 A1 Sep. 24, 2020

Related U.S. Application Data

(63) Continuation of application No. 16/123,513, filed on Sep. 6, 2018, now Pat. No. 10,712,178.

(30) Foreign Application Priority Data

Oct. 31, 2017 (JP) .............................. JP2017-210918

(51) Int. Cl.
*G01D 5/16* (2006.01)
*G01D 5/14* (2006.01)
(52) U.S. Cl.
CPC .............. *G01D 5/16* (2013.01); *G01D 5/145* (2013.01)

(58) Field of Classification Search
CPC ................ G11B 5/3909; G11B 5/3912; G11B 2005/3996; G11B 5/3932; G11B 5/398;
(Continued)

(56) References Cited

U.S. PATENT DOCUMENTS 4,837,537 A 6/1989 Nakada et al.
5,561,368 A 10/1996 Dovek et al.
(Continued)

FOREIGN PATENT DOCUMENTS

CN 203745708 U 7/2014
JP 2006-208252 A 8/2006
(Continued)

OTHER PUBLICATIONS

Oct. 23, 2019 Office Action issued in Japanese Patent Application No. 2017-210918.

(Continued)

*Primary Examiner* — Vinh P Nguyen
(74) *Attorney, Agent, or Firm* — Oliff PLC

(57) ABSTRACT

A position detection device includes a first magnetic field generation unit for generating a first magnetic field, a second magnetic field generation unit for generating a second magnetic field, and a magnetic sensor. The position of the second magnetic field generation unit relative to the first magnetic field generation unit is variable. The magnetic sensor detects the direction of a target magnetic field at a detection position in a reference plane. The target magnetic field is a composite magnetic field of first and second magnetic field components which are respective components of the first and second magnetic fields parallel to the reference plane. The magnetic sensor includes a magnetoresistive element including a free layer and a magnetization pinned layer. In the reference plane, two directions orthogonal to the magnetization direction of the magnetization (Continued)

pinned layer are each different from both of directions of the first and second magnetic field components.

9 Claims, 13 Drawing Sheets

(58) Field of Classification Search
CPC ... G11B 5/3906; G11B 5/3903; G11B 5/3929; G11B 5/1278; G11B 5/3163; G11B 5/012; G11B 5/3133; G11B 5/314; G11B 2005/0029; G11B 5/39; G11B 5/3951; G11B 5/3983; G11B 2005/0016; G11B 5/3116; G11B 5/3123; G11B 5/455; G01R 33/093; G01R 15/205; G01R 33/09; G01R 19/0092; G01R 33/0017; G01R 33/0206; G01R 33/0052; G01R 33/096; G01R 33/00; G01R 33/02; G01R 33/066; G01R 33/072; G01R 33/095; H01L 43/08; H01L 43/12; H01L 43/02; H01F 10/3254; H01F 10/3272; H01F 10/3259; H01F 10/3295; H01F 10/3281; H01F 41/303; H01F 10/3268; H01F 41/302; H01F 10/30; H01F 10/3286; H01F 41/307; G01P 15/105
See application file for complete search history.

(56) References Cited

U.S. PATENT DOCUMENTS

| | | | | |
|---|---|---|---|---|
| 6,033,491 | A * | 3/2000 | Lin | B82Y 10/00 148/108 |
| 7,150,093 | B2 * | 12/2006 | Beach | B82Y 10/00 29/603.09 |
| 8,257,596 | B2 * | 9/2012 | Mather | G01R 31/318357 216/22 |
| 8,446,147 | B2 | 5/2013 | Chiba et al. | |
| 8,466,676 | B2 * | 6/2013 | Saruki | G01R 33/0029 324/252 |
| 9,269,381 | B1 * | 2/2016 | Sapozhnikov | G11B 5/3932 |
| 10,006,789 | B2 | 6/2018 | Mochizuki et al. | |
| 10,365,121 | B2 | 7/2019 | Wong et al. | |
| 10,712,178 | B2 * | 7/2020 | Uchida | G01D 5/16 |
| 10,712,404 | B2 * | 7/2020 | Uchida | G01D 5/24495 |
| 11,002,805 | B2 * | 5/2021 | Uchida | G01R 33/0017 |
| 2007/0047152 | A1 | 3/2007 | Furukawa et al. | |
| 2007/0188946 | A1 | 8/2007 | Shoji | |
| 2010/0134096 | A1 | 6/2010 | Chiba et al. | |
| 2012/0098529 | A1 | 4/2012 | Kurihara | |
| 2015/0198816 | A1 | 7/2015 | Dong | |
| 2016/0169707 | A1 | 6/2016 | Hirota et al. | |
| 2016/0231528 | A1 | 8/2016 | Wong et al. | |
| 2017/0219913 | A1 | 8/2017 | Ito et al. | |
| 2019/0128698 | A1 | 5/2019 | Umehara et al. | |
| 2019/0128699 | A1 | 5/2019 | Uchida et al. | |

FOREIGN PATENT DOCUMENTS

| | | |
|---|---|---|
| JP | 2007-218700 A | 8/2007 |
| JP | 2011-223422 A | 11/2011 |
| JP | 2015-190880 A | 11/2015 |
| JP | 2016-223894 A | 12/2016 |
| WO | 2016/017490 A1 | 2/2016 |

OTHER PUBLICATIONS

Sep. 17, 2020 Office Action issued in Chinese Patent Application No. 201811157463.3.

Translation of Aug. 31, 2021 Office Action issued in German Patent Application No. 10 2018 123 772.3.

* cited by examiner

POSITION DETECTION DEVICE FOR DETECTING POSITION OF AN OBJECT MOVING IN A PREDETERMINED DIRECTION, AND A MAGNETIC SENSOR FOR USE WITH THE POSITION DETECTION DEVICE

This is a Continuation Application of U.S. patent application Ser. No. 16/123,513 filed Sep. 6, 2018, which claims the benefit of Japanese Patent Application No. 2017-210918 filed Oct. 31, 2017. The disclosure of the prior applications is hereby incorporated by reference herein in its entirety.

BACKGROUND OF THE INVENTION

1. Field of the Invention

The present invention relates to a magnetic sensor, and a position detection device using the magnetic sensor.

2. Description of the Related Art

Position detection devices using magnetic sensors have been used for a variety of applications. The position detection devices using magnetic sensors will hereinafter be referred to as magnetic position detection devices. For example, the magnetic position detection devices are used for detecting a lens position in a camera module having an autofocus mechanism incorporated in a smartphone.

US 2016/0231528 A1 discloses a technique of detecting a composite vector with a position sensor in an autofocus mechanism in which a lens is movably coupled to a substrate. The composite vector is generated by interaction between a first magnetic field having a constant strength in a first direction and a second magnetic field in a second direction generated by a magnet that moves with the lens. The second direction is orthogonal to the first direction. According to the technique, the magnitude of the second magnetic field varies depending on the lens position, and as a result, the angle that the composite vector forms with the second direction, which will hereinafter be referred to as the composite vector angle, also varies.

US 2007/0047152 A1 discloses a magnetic field detection apparatus that uses a magnetoresistive element of spin valve structure. This apparatus includes a bias unit for applying a bias magnetic field to the magnetoresistive element to change the characteristic of a resistance value of the magnetoresistive element to an external magnetic field.

JP 2016-223894A discloses a magnetic sensor including a rectangular substrate, and a first and a second magnetoresistive element formed on the substrate and connected to each other. A current path of the first magnetoresistive element is formed in a first direction that forms a predetermined angle with a side of the substrate. A current path of the second magnetoresistive element is formed in a second direction orthogonal to the first direction.

According to the technique disclosed in US 2016/0231528 A1, it is possible to detect the lens position by detecting the composite vector angle.

As described in US 2007/0047152 A1, the magnetoresistive element of spin valve structure is unable to correctly detect a magnetic field without using a linear characteristic area of the magnetoresistive element. The linear characteristic area of a magnetoresistive element refers to, in a characteristic diagram representing the relationship between a magnetic field applied to the magnetoresistive element and a resistance value of the magnetoresistive element, an area in which the resistance value of the magnetoresistive element varies linearly or substantially linearly with respect to changes in the applied magnetic field. US 2007/0047152 A1 describes a technology to vary the characteristic of the resistance value of the magnetoresistive element to an external magnetic field by applying a bias magnetic field to the magnetoresistive element.

Now, consider a position detection device for detecting the position of a target object such as a lens by detecting the composite vector angle as described in, e.g., US 2016/0231528 A1, using a magnetic sensor including a magnetoresistive element. For such a position detection device, the variable range of the composite vector angle is determined according to the movable range of the target object. Conventionally, no consideration has been given to enhancing the detection accuracy of the magnetic sensor including a magnetoresistive element in the variable range of the composite vector angle.

SUMMARY OF THE INVENTION

It is an object of the present invention to provide a position detection device that uses a magnetic sensor and is capable of performing position detection with high accuracy, and to provide a magnetic sensor suitable for use in the position detection device.

A position detection device of the present invention includes a first magnetic field generation unit for generating a first magnetic field, a second magnetic field generation unit for generating a second magnetic field, and a magnetic sensor. The second magnetic field generation unit is provided such that its position relative to the first magnetic field generation unit is variable. The magnetic sensor generates a detection signal corresponding to the direction of a detection-target magnetic field at a detection position in a reference plane.

The magnetic sensor includes at least one magnetoresistive element. The at least one magnetoresistive element includes a magnetization pinned layer having a magnetization whose direction is fixed, and a free layer having a magnetization whose direction is variable according to the direction of the detection-target magnetic field. The reference plane is a plane that contains the direction of the magnetization of the magnetization pinned layer and the direction of the detection-target magnetic field.

When the position of the second magnetic field generation unit relative to the first magnetic field generation unit varies, the strength of a second magnetic field component varies whereas none of the strength and direction of a first magnetic field component and the direction of the second magnetic field component vary, where the first magnetic field component is a component of the first magnetic field at the detection position, the component of the first magnetic field being parallel to the reference plane, and the second magnetic field component is a component of the second magnetic field at the detection position, the component of the second magnetic field being parallel to the reference plane. The detection-target magnetic field is a composite magnetic field of the first magnetic field component and the second magnetic field component. In the reference plane, each of two directions orthogonal to the direction of the magnetization of the magnetization pinned layer is different from both of the direction of the first magnetic field component and the direction of the second magnetic field component.

In the position detection device of the present invention, the direction of the second magnetic field component may be orthogonal to the direction of the first magnetic field component.

In the position detection device of the present invention, a variation in the position of the second magnetic field generation unit relative to the first magnetic field generation unit may vary the distance between the detection position and the second magnetic field generation unit.

In the position detection device of the present invention, one of the two directions orthogonal to the direction of the magnetization of the magnetization pinned layer may be contained in a variable range of the direction of the detection-target magnetic field, the variable range corresponding to a movable range of the position of the second magnetic field generation unit relative to the first magnetic field generation unit. In this case, the one of the two directions orthogonal to the direction of the magnetization of the magnetization pinned layer may be the same as a direction in the middle of the variable range of the direction of the detection-target magnetic field. When the position of the second magnetic field generation unit relative to the first magnetic field generation unit is in the middle of the movable range of the position of the second magnetic field generation unit relative to the first magnetic field generation unit, the direction of the detection-target magnetic field may be the same as the one of the two directions orthogonal to the direction of the magnetization of the magnetization pinned layer.

In the position detection device of the present invention, the first magnetic field generation unit may include two magnets disposed at different positions. In this case, the first magnetic field may be a composite of two magnetic fields that are respectively generated by the two magnets.

The position detection device of the present invention may further include a first holding member for holding the first magnetic field generation unit, and a second holding member for holding the second magnetic field generation unit, the second holding member being provided such that its position is variable in one direction relative to the first holding member. In this case, the second holding member may be configured to hold a lens, and may be provided such that its position is variable in a direction of an optical axis of the lens relative to the first holding member.

A magnetic sensor of the present invention is configured to generate, at a detection position in a reference plane, a detection signal corresponding to the direction of a detection-target magnetic field that varies within a variable range below 180° in the reference plane. The magnetic sensor of the present invention includes at least one magnetoresistive element. The at least one magnetoresistive element includes a magnetization pinned layer having a magnetization whose direction is fixed, and a free layer having a magnetization whose direction is variable according to the direction of the detection-target magnetic field. The reference plane is a plane that contains the direction of the magnetization of the magnetization pinned layer and the direction of the detection-target magnetic field. One of two directions orthogonal to the direction of the magnetization of the magnetization pinned layer is contained in the variable range of the direction of the detection-target magnetic field.

In the magnetic sensor of the present invention, the one of the two directions orthogonal to the direction of the magnetization of the magnetization pinned layer may be the same as a direction in the middle of the variable range of the direction of the detection-target magnetic field. The variable range of the direction of the detection-target magnetic field may be below 90°.

In the position detection device and the magnetic sensor of the present invention, the at least one magnetoresistive element may be at least one first magnetoresistive element and at least one second magnetoresistive element. The magnetic sensor may further include a power supply port configured to receive a predetermined voltage, a ground port connected to a ground, and an output port. In this case, the at least one first magnetoresistive element is provided between the power supply port and the output port. The at least one second magnetoresistive element is provided between the output port and the ground port. The magnetization of the magnetization pinned layer of the at least one first magnetoresistive element is in a first direction. The magnetization of the magnetization pinned layer of the at least one second magnetoresistive element is in a second direction opposite to the first direction. The detection signal depends on an electric potential at the output port.

In the position detection device and the magnetic sensor of the present invention, the at least one magnetoresistive element may be at least one first magnetoresistive element, at least one second magnetoresistive element, at least one third magnetoresistive element, and at least one fourth magnetoresistive element. The magnetic sensor may further include a power supply port configured to receive a predetermined voltage, a ground port connected to a ground, a first output port, and a second output port. In this case, the at least one first magnetoresistive element is provided between the power supply port and the first output port. The at least one second magnetoresistive element is provided between the first output port and the ground port. The at least one third magnetoresistive element is provided between the power supply port and the second output port. The at least one fourth magnetoresistive element is provided between the second output port and the ground port.

The magnetization of the magnetization pinned layer of the at least one first magnetoresistive element and the magnetization of the magnetization pinned layer of the at least one fourth magnetoresistive element are in a first direction. The magnetization of the magnetization pinned layer of the at least one second magnetoresistive element and the magnetization of the magnetization pinned layer of the at least one third magnetoresistive element are in a second direction opposite to the first direction. The detection signal depends on a potential difference between the first output port and the second output port.

According to the position detection device of the present invention, the direction of the detection-target magnetic field is different from both of the direction of the first magnetic field component and the direction of the second magnetic field component, and is between those directions. According to the position detection device of the present invention, in the reference plane, each of the two directions orthogonal to the magnetization direction of the magnetization pinned layer is different from both of the direction of the first magnetic field component and the direction of the second magnetic field component. It is thus possible for the position detection device of the present invention to bring one of the two directions orthogonal to the magnetization direction of the magnetization pinned layer close to or within the variable range of the direction of the detection-target magnetic field. This enables enhancement of detection accuracy of at least one magnetoresistive element in the variable range of the direction of the detection-target magnetic field. The position detection device of the present invention is thus capable of performing position detection with high accuracy.

According to the magnetic sensor of the present invention, one of the two directions orthogonal to the magnetization direction of the magnetization pinned layer is contained in the variable range of the direction of the detection-target magnetic field, which is below 180°. This enables the magnetic sensor of the present invention to detect the direction of the detection-target magnetic field with high accuracy.

Other and further objects, features and advantages of the present invention will appear more fully from the following description.

DETAILED DESCRIPTION OF THE PREFERRED EMBODIMENT

Figure 1:
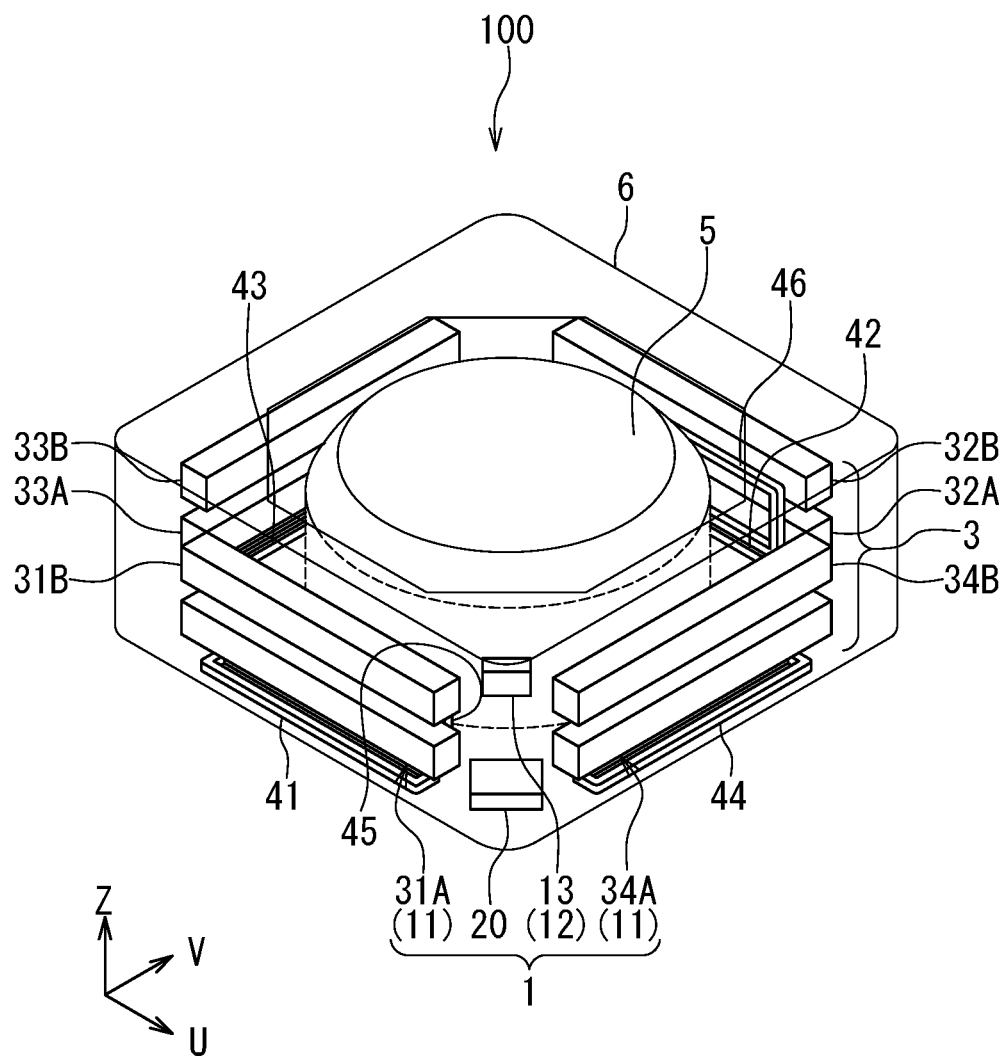
FIG. 1 is a perspective view of a camera module including a position detection device according to an embodiment of the invention.
Figure 2:
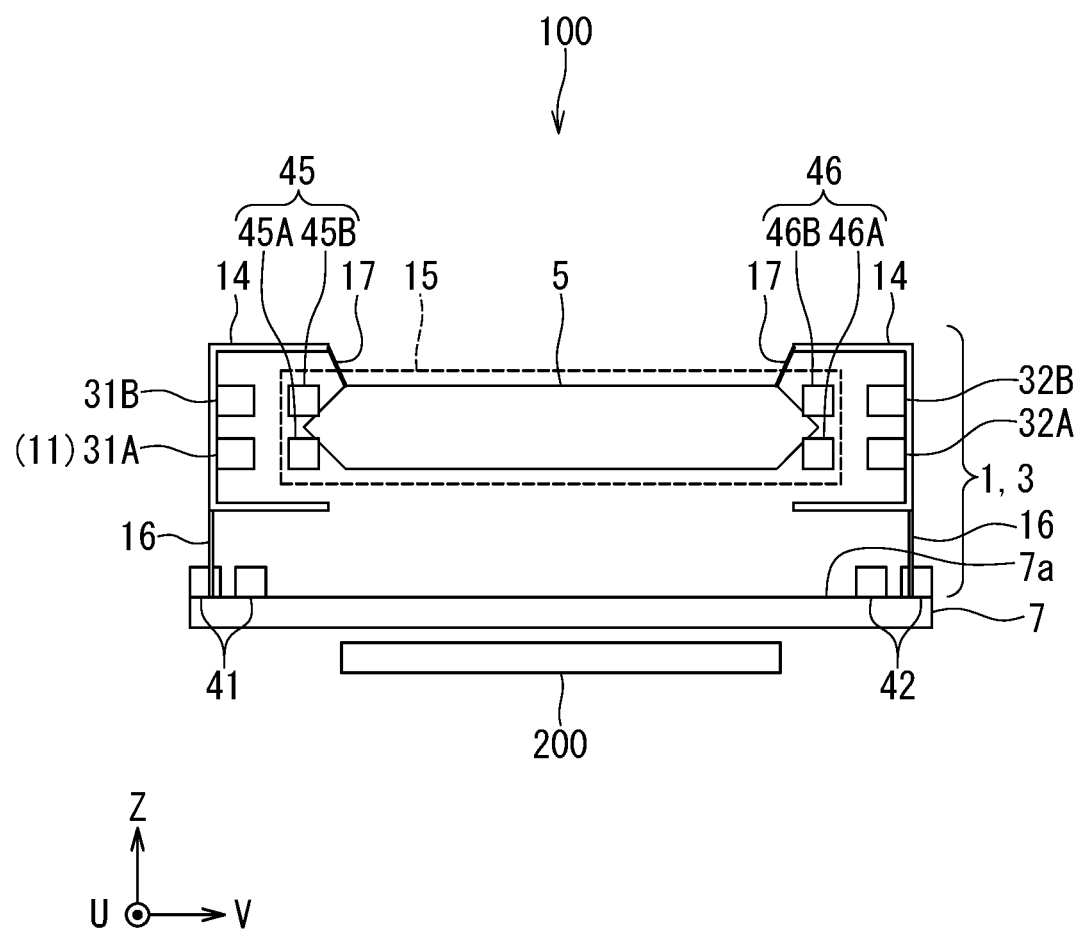
FIG. 2 illustrates an internal schematic view of the camera module of FIG. 1.

A preferred embodiment of the present invention will now be described in detail with reference to the drawings. First, reference is made to FIG. 1 and FIG. 2 to describe the configuration of a camera module including a position detection device according to the embodiment of the invention. FIG. 1 is a perspective view of the camera module 100. FIG. 2 is a schematic internal view of the camera module 100. For ease of understanding, in FIG. 2 the parts of the cameral module 100 are drawn on a different scale and in a different layout than those in FIG. 1. The camera module 100 constitutes, for example, a portion of a camera for a smartphone having an optical image stabilization mechanism and an autofocus mechanism, and is used in combination with an image sensor 200 that uses CMOS or other similar techniques.

The camera module 100 includes a position detection device 1 according to the embodiment, and a driving device 3, a lens 5, a housing 6 and a substrate 7. The position detection device 1 according to the embodiment is a magnetic position detection device, and is used to detect the position of the lens 5 during automatic focusing. The driving device 3 is to move the lens 5. The housing 6 is to protect the position detection device 1 and the driving device 3. The substrate 7 has a top surface 7a. FIG. 1 omits the illustration of the substrate 7, and FIG. 2 omits the illustration of the housing 6.

Now, we define U, V, and Z directions as shown in FIGS. 1 and 2. The U, V, and Z directions are orthogonal to one another. In the embodiment, the Z direction is a direction perpendicular to the top surface 7a of the substrate 7. In FIG. 2 the Z direction is the upward direction. The U and V directions are both parallel to the top surface 7a of the substrate 7. The opposite directions to the U, V, and Z directions will be referred to as −U, −V, and −Z directions, respectively. As used herein, the term "above" refers to positions located forward of a reference position in the Z direction, and "below" refers to positions located on a side of the reference position opposite from "above".

The lens 5 is disposed above the top surface 7a of the substrate 7 in such an orientation that the direction of its optical axis is parallel to the Z direction. The substrate 7 has an opening (not illustrated) for passing light that has passed through the lens 5. As shown in FIG. 2, the camera module 100 is in alignment with the image sensor 200 so that light that has passed through the lens 5 and the non-illustrated opening will enter the image sensor 200.

Figure 3:
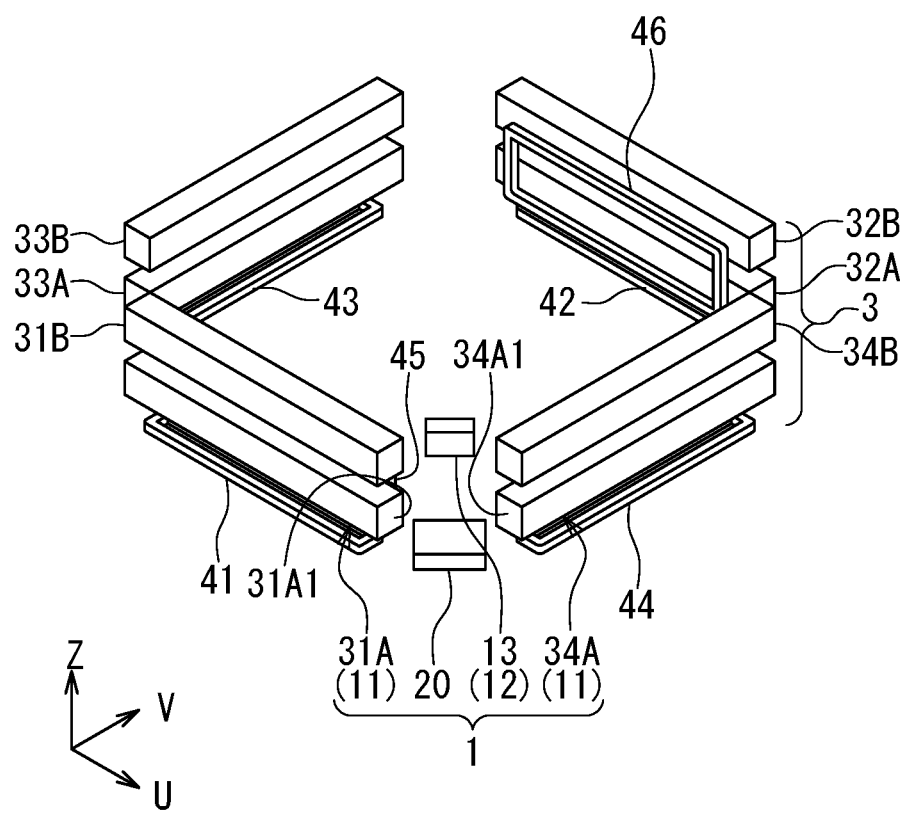
FIG. 3 is a perspective view of the position detection device and a driving device according to the embodiment of the invention.
Figure 4:
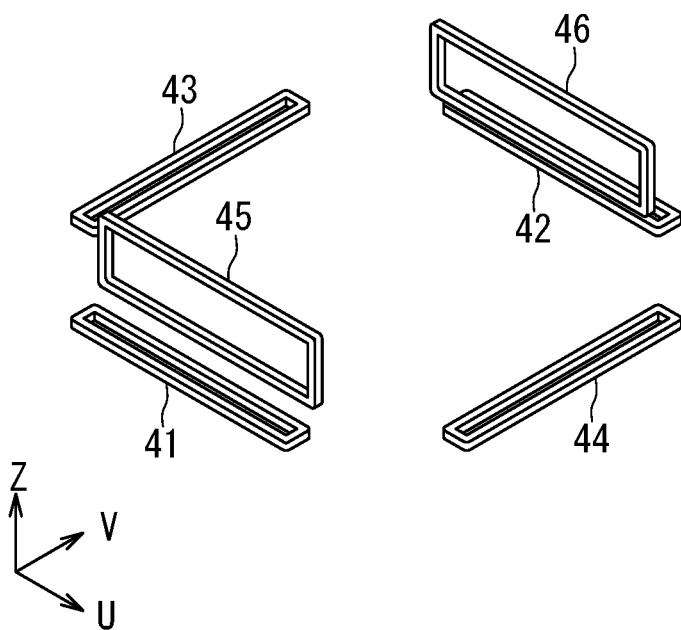
FIG. 4 is a perspective view of a plurality of coils of the driving device of FIG. 1.
Figure 5:
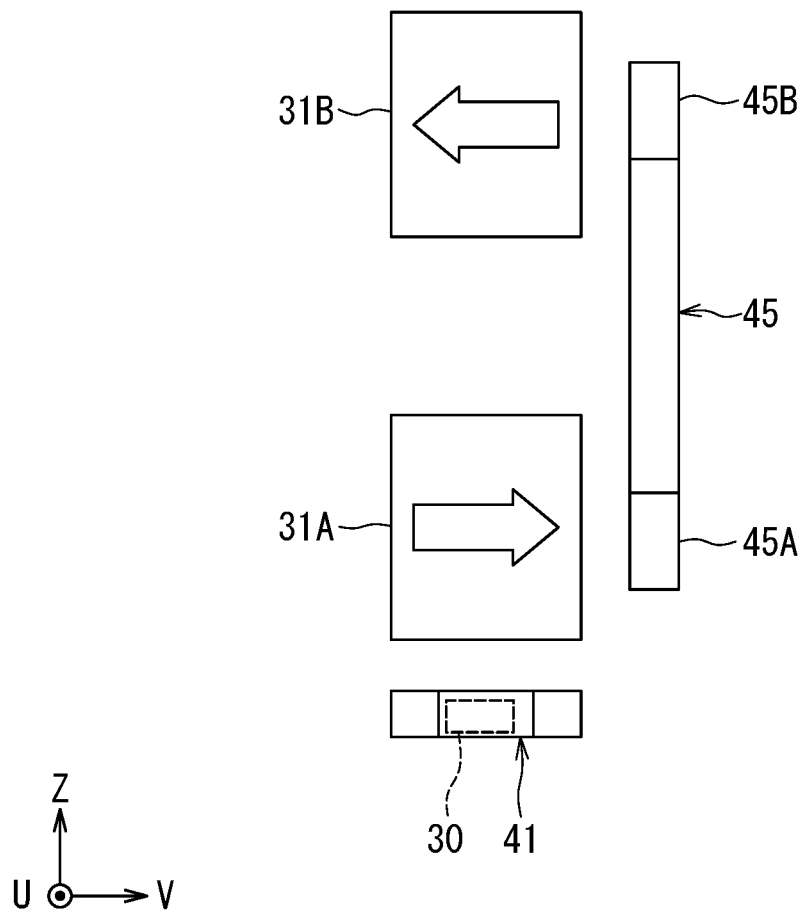
FIG. 5 is a side view illustrating the principal parts of the driving device of FIG. 1.

The position detection device 1 and the driving device 3 according to the embodiment will now be described in detail with reference to FIG. 2 to FIG. 5. FIG. 3 is a perspective view of the position detection device 1 and the driving device 3. FIG. 4 is a perspective view of a plurality of coils of the driving device 3. FIG. 5 is a side view illustrating the principal parts of the driving device 3.

The position detection device 1 includes a first holding member 14, a second holding member 15, a plurality of first wires 16, and a plurality of second wires 17. The second holding member 15 is to hold the lens 5. Although not illustrated, the second holding member 15 is shaped like a hollow cylinder so that the lens 5 is insertable in the hollow.

The second holding member 15 is provided such that its position is variable in one direction, specifically, in the direction of the optical axis of the lens 5, i.e., a direction parallel to the Z direction, relative to the first holding member 14. In the embodiment, the first holding member 14 is shaped like a box so that the lens 5 and the second holding member 15 can be accommodated therein. The plurality of second wires 17 connect the first and second holding members 14 and 15 and support the second holding member 15 such that the second holding member 15 is movable in a direction parallel to the Z direction relative to the first holding member 14.

The first holding member 14 is provided above the top surface 7a of the substrate 7 such that its position is variable relative to the substrate 7 in a direction parallel to the U direction and in a direction parallel to the V direction. The plurality of first wires 16 connect the substrate 7 and the first holding member 14, and support the first holding member 14 such that the first holding member 14 is movable relative to the substrate 7 in a direction parallel to the U direction and in a direction parallel to the V direction. When the position of the first holding member 14 relative to the substrate 7 varies, the position of the second holding member 15 relative to the substrate 7 also varies.

The driving device 3 includes magnets 31A, 31B, 32A, 32B, 33A, 33B, 34A and 34B, and coils 41, 42, 43, 44, 45 and 46. The magnet 31A is located forward of the lens 5 in the −V direction. The magnet 32A is located forward of the lens 5 in the V direction. The magnet 33A is located forward of the lens 5 in the −U direction. The magnet 34A is located forward of the lens 5 in the U direction. The magnets 31B, 32B, 33B and 34B are located above the magnets 31A, 32A, 33A and 34A, respectively. The magnets 31A, 31B, 32A, 32B, 33A, 33B, 34A and 34B are fixed to the first holding member 14.

As shown in FIG. 3, the magnets 31A, 31B, 32A and 32B are each in the shape of a rectangular solid that is long in the U direction. The magnets 33A, 33B, 34A and 34B are each in the shape of a rectangular solid that is long in the V direction. The magnets 31A and 32B are magnetized in the V direction. The magnets 31B and 32A are magnetized in the −V direction. The magnets 33A and 34B are magnetized in the U direction. The magnets 33B and 34A are magnetized in the −U direction. In FIG. 5, the arrows drawn inside the magnets 31A and 31B indicate the magnetization directions of the magnets 31A and 31B.

The coil 41 is located between the magnet 31A and the substrate 7. The coil 42 is located between the magnet 32A and the substrate 7. The coil 43 is located between the magnet 33A and the substrate 7. The coil 44 is located between the magnet 34A and the substrate 7. The coil 45 is located between the lens 5 and the magnets 31A and 31B. The coil 46 is located between the lens 5 and the magnets 32A and 32B. The coils 41, 42, 43 and 44 are fixed to the substrate 7. The coils 45 and 46 are fixed to the second holding member 15.

The coil 41 is subjected mainly to a magnetic field generated by the magnet 31A. The coil 42 is subjected mainly to a magnetic field generated by the magnet 32A. The coil 43 is subjected mainly to a magnetic field generated by the magnet 33A. The coil 44 is subjected mainly to a magnetic field generated by the magnet 34A.

As shown in FIGS. 2, 4 and 5, the coil 45 includes a first conductor portion 45A extending along the magnet 31A in the U direction, a second conductor portion 45B extending along the magnet 31B in the U direction, and two third conductor portions connecting the first and second conductor portions 45A and 45B. As shown in FIGS. 2 and 4, the coil 46 includes a first conductor portion 46A extending along the magnet 32A in the U direction, a second conductor portion 46B extending along the magnet 32B in the U direction, and two third conductor portions connecting the first and second conductor portions 46A and 46B.

The first conductor portion 45A of the coil 45 is subjected mainly to a component in the V direction of the magnetic field generated by the magnet 31A. The second conductor portion 45B of the coil 45 is subjected mainly to a component in the −V direction of a magnetic field generated by the magnet 31B. The first conductor portion 46A of the coil 46 is subjected mainly to a component in the −V direction of the magnetic field generated by the magnet 32A. The second conductor portion 46B of the coil 46 is subjected mainly to a component in the V direction of a magnetic field generated by the magnet 32B.

The position detection device 1 further includes a first magnetic field generation unit 11 for generating a first magnetic field, a second magnetic field generation unit 12 for generating a second magnetic field, and a magnetic sensor 20. In the embodiment, the first magnetic field generation unit 11 has two magnets disposed at different positions. In the embodiment, specifically, the first magnetic field generation unit 11 has the magnets 31A and 34A as the aforementioned two magnets. The first magnetic field is a composite of the magnetic fields generated by the magnets 31A and 34A. As mentioned above, the magnets 31A and 34A are fixed to the first holding member 14. The first magnetic field generation unit 11 is thus held by the first holding member 14.

As shown in FIG. 3, the magnet 31A has an end face 31A1 located at the end of the magnet 31A in the U direction. The magnet 34A has an end face 34A1 located at the end of the magnet 34A in the −V direction.

The second magnetic field generation unit 12 is provided such that its position relative to the first magnetic field generation unit 11 is variable. In the embodiment, the second magnetic field generation unit 12 has a magnet 13. The second magnetic field is a magnetic field generated by the magnet 13. The magnet 13 is in the shape of a rectangular solid. The magnet 13 is fixed to the second holding member 15 in a space near the end face 31A1 of the magnet 31A and the end face 34A1 of the magnet 34A. The second magnetic field generation unit 12 is thus held by the second holding member 15. When the position of the second holding member 15 relative to the first holding member 14 varies in a direction parallel to the Z direction, the position of the second magnetic field generation unit 12 relative to the first magnetic field generation unit 11 also varies in the direction parallel to the Z direction.

The magnetic sensor 20 includes at least one magnetoresistive (MR) element. The magnetic sensor 20 detects a detection-target magnetic field at a detection position in a reference plane, and generates a detection signal corresponding to the direction of the detection-target magnetic field. The detection-target magnetic field will hereinafter be referred to as the target magnetic field MF. The magnetic sensor 20 is fixed to the substrate 7 in the vicinity of the end face 31A1 of the magnet 31A and the end face 34A1 of the magnet 34A. The distance between the magnet 31A and the magnetic sensor 20 is equal to the distance between the magnet 34A and the magnetic sensor 20. The magnet 13 is located above the magnetic sensor 20.

The detection position is a position at which the magnetic sensor 20 detects the first magnetic field and the second magnetic field. In the embodiment, the reference plane is a plane that contains the detection position and is perpendicular to the Z direction. When the position of the second magnetic field generation unit 12 relative to the first magnetic field generation unit 11 varies, the distance between the detection position and the second magnetic field generation unit 12 varies.

Figure 6:
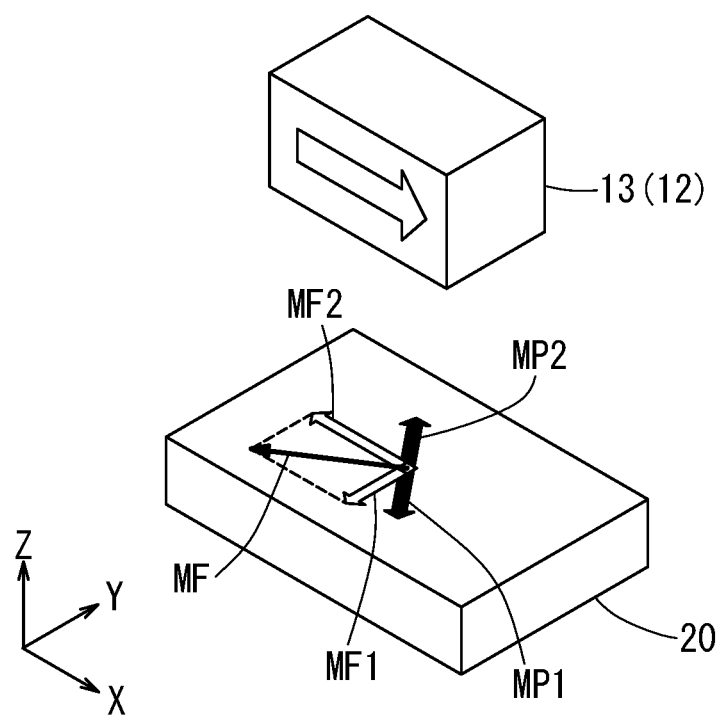
FIG. 6 is a perspective view illustrating the principal parts of the position detection device according to the embodiment of the invention.
Figure 9:
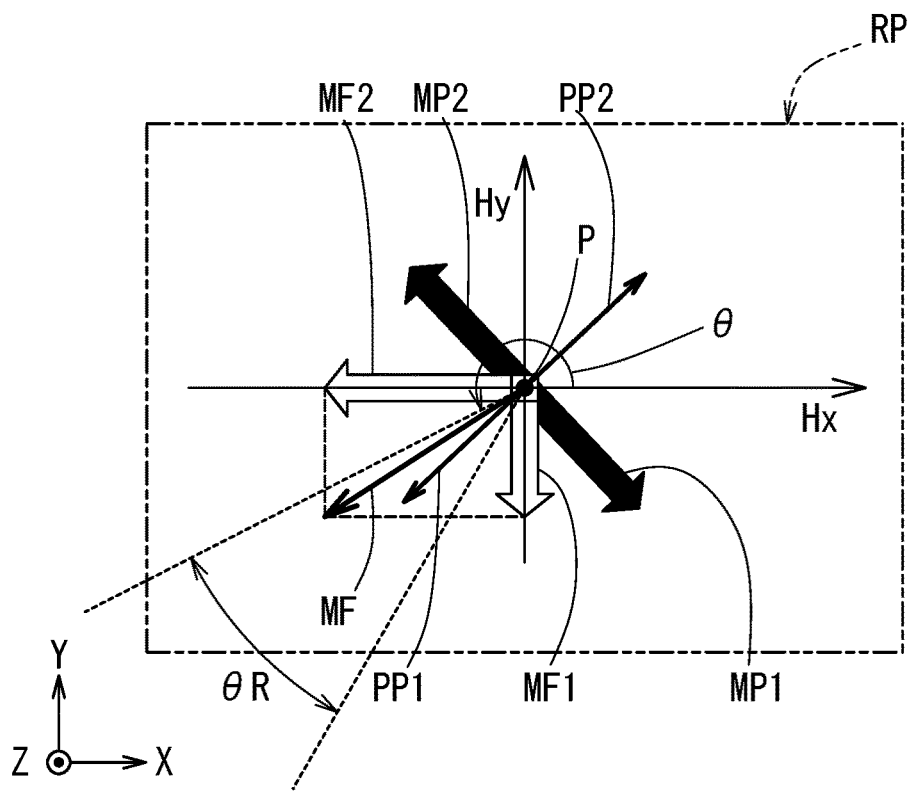
FIG. 9 is an explanatory diagram illustrating the magnetization direction of a magnetization pinned layer and the directions of first and second magnetic field components in the embodiment of the invention.

A component of the first magnetic field at the detection position, the component being parallel to the reference plane, will be referred to the first magnetic field component MF1. A component of the second magnetic field at the detection position, the component being parallel to the reference plane, will be referred to as the second magnetic field component MF2. The target magnetic field MF is a composite of the first magnetic field component MF1 and the second magnetic field component MF2. The first and second magnetic field components MF1 and MF2 and the target magnetic field MF are shown in FIG. 6 and FIG. 9 to be described later.

The positional relationships among the first magnetic field generation unit 11, the second magnetic field generation unit 12 and the magnetic sensor 20, and the configuration of the magnetic sensor 20 will be described in more detail later.

The driving device 3 further includes a magnetic sensor 30 disposed on the inner side of one of the coils 41 and 42 and fixed to the substrate 7, and a magnetic sensor 30 disposed on the inner side of one of the coils 43 and 44 and fixed to the substrate 7. Assume here that the two magnetic sensors 30 are disposed on the inner sides of the coils 41 and 44, respectively. As will be described later, the two magnetic sensors 30 are used to adjust the position of the lens 5 to reduce the effect of hand-induced camera shake.

The magnetic sensor 30 disposed on the inner side of the coil 41 detects the magnetic field generated by the magnet 31A and generates a signal corresponding to the position of the magnet 31A. The magnetic sensor 30 disposed on the inner side of the coil 44 detects the magnetic field generated by the magnet 34A and generates a signal corresponding to the position of the magnet 34A. For example, the magnetic sensors 30 are constructed of elements for detecting magnetic fields, such as Hall elements.

The positional relationships among the first magnetic field generation unit 11, the second magnetic field generation unit 12 and the magnetic sensor 20 will now be described in detail with reference to FIGS. 3 and 6. FIG. 6 is a perspective view illustrating the principal parts of the position detection device 1. Here, X and Y directions are defined as shown in FIG. 6. Both the X and Y directions are parallel to the top surface 7a (see FIG. 2) of the substrate 7. The X direction is the direction rotated by 45° from the U direction toward the V direction. The Y direction is the direction rotated by 45° from the V direction toward the −U direction. The opposite directions to the X and Y directions will be referred to as −X and −Y directions, respectively.

In FIG. 6, the arrow labeled MF1 represents the first magnetic field component MF1. In the embodiment, the first magnetic field generation unit 11 and the magnetic sensor 20 are provided to orient the first magnetic field component MF1 in the −Y direction. The direction of the first magnetic field component MF1 is adjustable by adjusting, for example, the positional relationships of the magnets 31A and 34A with respect to the magnetic sensor 20 and the orientations of the magnets 31A and 34A. The magnets 31A and 34A are preferably placed to be symmetric with respect to a YZ plane that contains the detection position.

In FIG. 6, the arrow labeled MF2 represents the second magnetic field component MF2, and the arrow drawn inside the magnet 13 indicates the magnetization direction of the magnet 13. The direction of the second magnetic field component MF2 is different from the direction of the first magnetic field component MF1. The direction of the target magnetic field MF is different from both of the directions of the first and second magnetic field components MF1 and MF2, and is between those directions. The variable range of the direction of the target magnetic field MF is below 180°. In the embodiment, specifically, the second magnetic field component MF2 is in the −X direction orthogonal to the direction of the first magnetic field component MF1. In this case, the variable range of the direction of the target magnetic field MF is below 90°.

Figure 7:
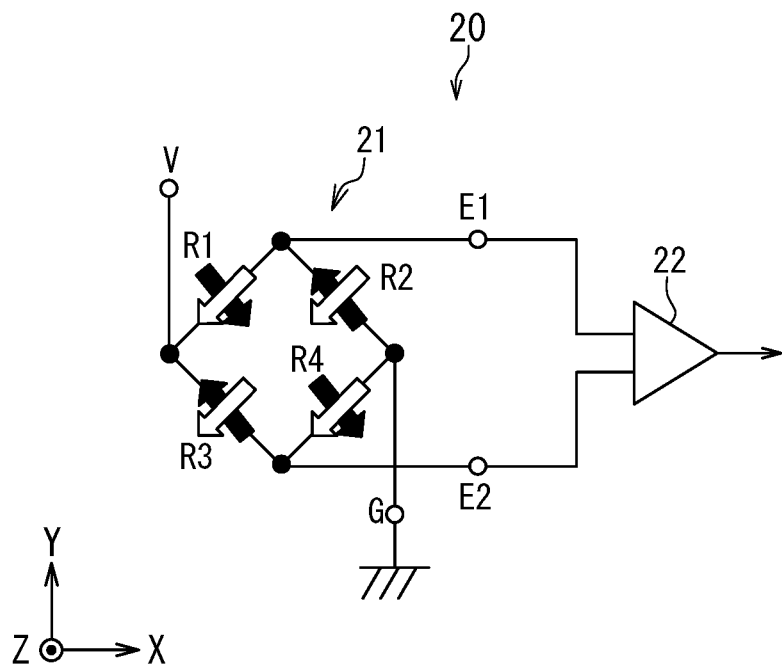
FIG. 7 is a circuit diagram illustrating the configuration of a magnetic sensor of the embodiment of the invention.

An example of configuration of the magnetic sensor 20 will now be described with reference to FIG. 7. FIG. 7 is a circuit diagram illustrating the configuration of the magnetic sensor 20. In the embodiment, the magnetic sensor 20 is configured to generate, as a detection signal corresponding to the direction of the target magnetic field MF, a detection signal corresponding to an angle that the direction of the target magnetic field MF forms with a reference direction. In the embodiment the reference direction is the X direction.

As shown in FIG. 7, the magnetic sensor 20 includes a Wheatstone bridge circuit 21 and a difference detector 22. The Wheatstone bridge circuit 21 includes a power supply port V configured to receive a predetermined voltage, a ground port G connected to the ground, a first output port E1, and a second output port E2.

The Wheatstone bridge circuit 21 further includes a first resistor section R1, a second resistor section R2, a third resistor section R3, and a fourth resistor section R4. The first resistor section R1 is provided between the power supply port V and the first output port E1. The second resistor section R2 is provided between the first output port E1 and the ground port G The third resistor section R3 is provided between the power supply port V and the second output port E2. The fourth resistor section R4 is provided between the second output port E2 and the ground port G.

The first resistor section R1 includes at least one first MR element. The second resistor section R2 includes at least one second MR element. The third resistor section R3 includes at least one third MR element. The fourth resistor section R4 includes at least one fourth MR element.

In the embodiment, specifically, the first resistor section R1 includes a plurality of first MR elements connected in series, the second resistor section R2 includes a plurality of second MR elements connected in series, the third resistor section R3 includes a plurality of third MR elements connected in series, and the fourth resistor section R4 includes a plurality of fourth MR elements connected in series.

Each of the plurality of MR elements included in the Wheatstone bridge circuit 21 is a spin-valve MR element. The spin-valve MR element includes a magnetization pinned layer having a magnetization whose direction is fixed, a free layer having a magnetization whose direction is variable according to the direction of the target magnetic field, and a gap layer disposed between the magnetization pinned layer and the free layer. The spin-valve MR element may be a tunneling magnetoresistive (TMR) element or a giant magnetoresistive (GMR) element. In the TMR element, the gap layer is a tunnel barrier layer. In the GMR element, the gap layer is a nonmagnetic conductive layer. The spin-valve MR element varies in resistance according to the angle that the magnetization direction of the free layer forms with the magnetization direction of the magnetization pinned layer, and has a minimum resistance when the foregoing angle is 0° and a maximum resistance when the foregoing angle is 180°. In FIG. 7, the filled arrows indicate the magnetization directions of the magnetization pinned layers of the MR elements, and the hollow arrows indicate the magnetization directions of the free layers of the MR elements.

The magnetization pinned layers of the MR elements in the resistor sections R1 and R4 have magnetizations in a first direction. The magnetization pinned layers of the MR elements in the resistor sections R2 and R3 have magnetizations in a second direction opposite to the first direction. The first direction will be denoted by the symbol MP1, and the second direction will be denoted by the symbol MP2. FIG. 6 shows the first direction MP1 and the second direction MP2. As will be described in detail later, in the embodiment, each of the two directions orthogonal to the first direction MP1 in the reference plane is different from both of the direction of the first magnetic field component MF1 and the direction of the second magnetic field component MF2. In the reference plane, the two directions orthogonal to the second direction MP2 are the same as the two directions orthogonal to the first direction MP1. Therefore, in the reference plane, each of the two directions orthogonal to the second direction MP2 is also different from both of the direction of the first magnetic field component MF1 and the direction of the second magnetic field component MF2.

The electric potential at the output port E1, the electric potential at the output port E2, and the potential difference between the output ports E1 and E2 vary according to the cosine of the angle that the direction of the target magnetic field MF forms with the first direction MP1. The difference detector 22 outputs a signal corresponding to the potential difference between the output ports E1 and E2 as a detection signal. The detection signal depends on the electric potential at the output port E1, the electric potential at the output port E2, and the potential difference between the output ports E1 and E2. The detection signal varies according to the direction of the target magnetic field MF, and therefore corresponds to the direction of the target magnetic field MF.

Figure 8:
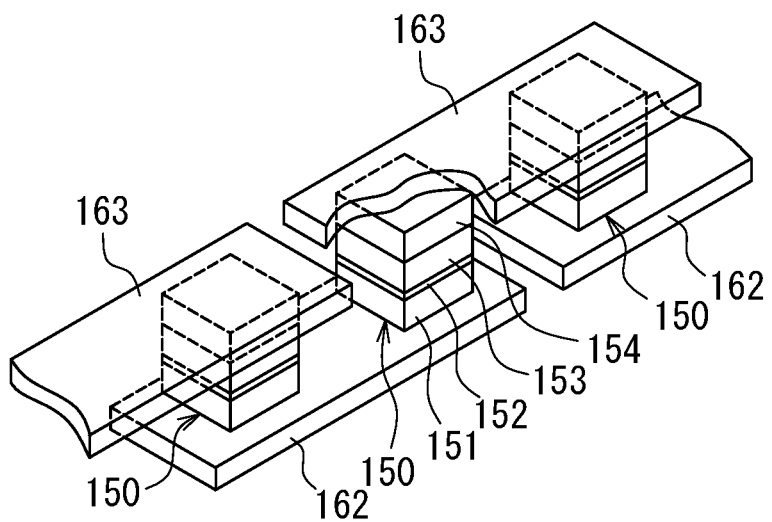
FIG. 8 is a perspective view of a portion of a resistor section of FIG. 7.

An example of the configuration of the resistor sections R1, R2, R3 and R4 will now be described with reference to FIG. 8. FIG. 8 is a perspective view illustrating a portion of one of the resistor sections R1, R2, R3 and R4. In this example, the resistor section includes a plurality of lower electrodes 162, a plurality of MR elements 150 and a plurality of upper electrodes 163. The plurality of lower electrodes 162 are arranged on a substrate (not illustrated). Each of the lower electrodes 162 has a long slender shape. Every two lower electrodes 162 that are adjacent to each other in the longitudinal direction of the lower electrodes 162 have a gap therebetween. As shown in FIG. 8, MR elements 150 are provided on the top surfaces of the lower electrodes 162, near opposite ends in the longitudinal direction. Each of the MR elements 150 includes a free layer 151, a gap layer 152, a magnetization pinned layer 153, and an antiferromagnetic layer 154 which are stacked in this order, the free layer 151 being closest to the lower electrode 162. The free layer 151 is electrically connected to the lower electrode 162. The antiferromagnetic layer 154 is formed of an antiferromagnetic material. The antiferromagnetic layer 154 is in exchange coupling with the magnetization pinned layer 153 so as to fix the magnetization direction of the magnetization pinned layer 153. The plurality of upper electrodes 163 are arranged over the plurality of MR elements 150. Each of the upper electrodes 163 has a long slender shape, and establishes electrical connection between the respective antiferromagnetic layers 154 of two adjacent MR elements 150 that are arranged on two lower electrodes 162 adjacent in the longitudinal direction of the lower electrodes 162. With such a configuration, in the resistor section shown in FIG. 8 the plurality of MR elements 150 are connected in series by the plurality of lower electrodes 162 and the plurality of upper electrodes 163.

It should be appreciated that the layers 151 to 154 of each MR element 150 may be stacked in the reverse order to that shown in FIG. 8. Each MR element 150 may also be configured without the antiferromagnetic layer 154. In such a configuration, for example, a magnetization pinned layer of an artificial antiferromagnetic structure, which includes two ferromagnetic layers and a nonmagnetic metal layer interposed between the two ferromagnetic layers, may be provided in place of the antiferromagnetic layer 154 and the magnetization pinned layer 153.

Reference is now made to FIG. 2 to FIG. 5 to describe the operation of the driving device 3. The driving device 3 constitutes part of optical image stabilization and autofocus mechanisms. Such mechanisms will be briefly described first. A control unit (not illustrated) external to the camera module 100 controls the driving device 3, the optical image stabilization mechanism and the autofocus mechanism.

The optical image stabilization mechanism is configured to detect hand-induced camera shake using, for example, a gyrosensor external to the camera module 100. Upon detection of hand-induced camera shake by the optical image stabilization mechanism, the non-illustrated control unit controls the driving device 3 so as to vary the position of the lens 5 relative to the substrate 7 depending on the mode of the camera shake. This stabilizes the absolute position of the lens 5 to reduce the effect of the camera shake. The position of the lens 5 relative to the substrate 7 is varied in a direction parallel to the U direction or parallel to the V direction, depending on the mode of the camera shake.

The autofocus mechanism is configured to detect a state in which focus is achieved on the subject, using, for example, an image sensor 200 or an autofocus sensor. Using the driving device 3, the non-illustrated control unit varies the position of the lens 5 relative to the substrate 7 in a direction parallel to the Z direction so as to achieve focus on the subject. This enables automatic focusing on the subject.

Next, a description will be given of the operation of the driving device 3 related to the optical image stabilization mechanism. When currents are passed through the coils 41 and 42 by the non-illustrated control unit, the first holding member 14 with the magnets 31A and 32A fixed thereto moves in a direction parallel to the V direction due to interaction between the magnetic fields generated by the magnets 31A and 32A and the magnetic fields generated by the coils 41 and 42. As a result, the lens 5 also moves in the direction parallel to the V direction. On the other hand, when currents are passed through the coils 43 and 44 by the non-illustrated control unit, the first holding member 14 with the magnets 33A and 34A fixed thereto moves in a direction parallel to the U direction due to interaction between the magnetic fields generated by the magnets 33A and 34A and the magnetic fields generated by the coils 43 and 44. As a result, the lens 5 also moves in the direction parallel to the U direction. The non-illustrated control unit detects the position of the lens 5 by measuring signals corresponding to the positions of the magnets 31A and 34A, which are generated by the two magnetic sensors 30.

Next, the operation of the driving device 3 related to the autofocus mechanism will be described. To move the position of the lens 5 relative to the substrate 7 in the Z direction, the non-illustrated control unit passes a current through the coil 45 such that the current flows through the first conductor portion 45A in the U direction and flows through the second conductor portion 45B in the −U direction, and passes a current through the coil 46 such that the current flows through the first conductor portion 46A in the −U direction and flows through the second conductor portion 46B in the U direction. These currents and the magnetic fields generated by the magnets 31A, 31B, 32A and 32B cause a Lorentz force in the Z direction to be exerted on the first and second conductor portions 45A and 45B of the coil 45 and the first and second conductor portions 46A and 46B of the coil 46. This causes the second holding member 15 with the coils 45 and 46 fixed thereto to move in the Z direction. As a result, the lens 5 also moves in the Z direction.

To move the position of the lens 5 relative to the substrate 7 in the −Z direction, the non-illustrated control unit passes currents through the coils 45 and 46 in directions opposite to those in the case of moving the position of the lens 5 relative to the substrate 7 in the Z direction.

The function and effects of the position detection device 1 according to the embodiment will now be described. The position detection device 1 according to the embodiment is used to detect the position of the lens 5. In the embodiment, when the position of the lens 5 relative to the substrate 7 varies, the position of the second holding member 15 also varies relative to each of the substrate 7 and the first holding member 14. As previously mentioned, the first holding member 14 holds the first magnetic field generation unit 11, and the second holding member 15 holds the second magnetic field generation unit 12. Accordingly, when the position of the lens 5 relative to the substrate 7 varies as mentioned above, the position of the second magnetic field generation unit 12 relative to the first magnetic field generation unit 11 varies. Hereinafter, the position of the second magnetic field generation unit 12 relative to the first magnetic field generation unit 11 will be referred to as the relative position P12. In the embodiment, the relative position P12 is variable in a direction of the optical axis of the lens 5, that is, in a direction parallel to the Z direction.

When the relative position P12 varies, the position of the second magnetic field generation unit 12 relative to the substrate 7 varies whereas the position of the first magnetic field generation unit 11 relative to the substrate 7 does not vary. Accordingly, when the relative position P12 varies, the strength of the second magnetic field component MF2 varies whereas none of the strength and direction of the first magnetic field component MF1 and the direction of the second magnetic field component MF2 vary. When the strength of the second magnetic field component MF2 varies, the direction and strength of the target magnetic field MF vary, and accordingly, the value of the detection signal to be generated by the magnetic sensor 20 varies. The value of the detection signal varies according to the relative position P12. The non-illustrated control unit detects the relative position P12 by measuring the detection signal. The direction and magnitude of variation in the position of the lens 5 relative to the substrate 7 are the same as those of variation in the relative position P12. The relative position P12 can thus be indicative of the position of the lens 5 relative to the substrate 7.

Reference is now made to FIG. 9 to describe the first and second directions MP1 and MP2 and the first and second magnetic field components MF1 and MF2. In FIG. 9, the symbol RP represents the reference plane, and the symbol P represents the detection position. In FIG. 9, the arrow labeled MF1 represents the first magnetic field component MF1, the arrow labeled MF2 represents the second magnetic field component MF2, and the arrow labeled MF represents the target magnetic field. Further, in FIG. 9 the axis in the X direction represents the strength Hx of a magnetic field in the X direction, and the axis in the Y direction represents the strength Hy of a magnetic field in the Y direction.

Since the target magnetic field MF is a composite magnetic field of the first and second magnetic field components MF1 and MF2, the direction of the target magnetic field MF is different from both of the direction of the first magnetic field component MF1 and the direction of the second magnetic field component MF2, and is between those directions.

In FIG. 9, the symbols PP1 and PP2 represent two directions orthogonal to the first direction MP1 in the reference plane RP. Two directions orthogonal to the second direction MP2 in the reference plane RP are also the directions PP1 and PP2. In the embodiment, as mentioned previously, each of the two directions PP1 and PP2 is different from both of the direction of the first magnetic field component MF1 and the direction of the second magnetic field component MF2.

In FIG. 9, the symbol θ represents the angle that the direction of the target magnetic field MF forms with the reference direction (the X direction) as viewed in a counterclockwise direction from the reference direction (the X direction). The aforementioned angle θ will be referred to as the target angle θ. The target angle θ is indicative of the direction of the target magnetic field MF. In the embodiment, the magnetic sensor 20 generates a detection signal corresponding to the target angle θ.

Figure 10:
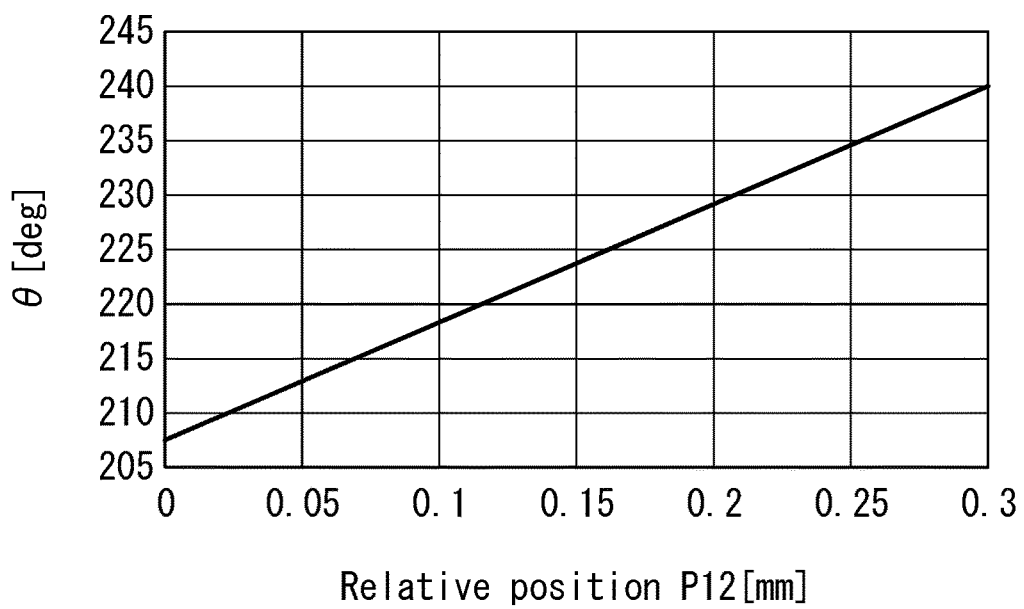
FIG. 10 is a characteristic diagram illustrating the relationship between a relative position P12 and a target angle in the embodiment of the invention.

The relationship between the relative position P12 and the target angle θ in the embodiment will now be described with reference to FIG. 10. FIG. 10 is a characteristic diagram illustrating the relationship between the relative position P12 and the target angle θ. In FIG. 10, the horizontal axis represents the relative position P12, and the vertical axis represents the target angle θ.

In the embodiment, the distance between the second magnetic field generation unit 12 and the detection position P when the second magnetic field generation unit 12 is closest to the detection position P is referred to as the minimum distance. The relative position P12 is represented as a value obtained by subtracting the minimum distance from the distance between the second magnetic field generation unit 12 at any position and the detection position P. In the embodiment, the movable range of the relative position P12 is set in a range of 0 to 0.3 mm.

In the embodiment, as shown in FIG. 10, as the relative position P12 varies over the movable range of 0 to 0.3 mm, the target angle θ varies over a variable range of 207° to 240°. The target angle θ varies in a linear manner with respect to the variations in the relative position P12. The target angle θ indicates the direction of the target magnetic field MF. Therefore, the variable range of the target angle θ corresponds to the variable range of the direction of the target magnetic field MF corresponding to the movable range of the relative position P12. In FIG. 9, the range represented by symbol θR is the variable range of the target angle θ.

In the embodiment, as shown in FIG. 9, each of the two directions PP1 and PP2 orthogonal to the magnetization direction of the magnetization pinned layer in the reference plane RP is different from both of the direction of the first magnetic field component MF1 and the direction of the second magnetic field component MF2. This feature enables the position detection device 1 according to the embodiment to perform position detection with high precision. This will be discussed below in comparison with a position detection device of a comparative example.

First, the position detection device of the comparative example will be described with reference to FIG. 11. In the position detection device of the comparative example, the magnetization directions of the magnetization pinned layers are different from those in the position detection device 1 according to the embodiment. In the comparative example, the first direction MP1, i.e., the magnetization direction of the magnetization pinned layers of the MR elements in the resistor sections R1 and R4, is the −Y direction. The second direction MP2, i.e., the magnetization direction of the magnetization pinned layers of the MR elements in the resistor sections R2 and R3, is the Y direction. The remainder of configuration of the position detection device of the comparative example is the same as that of the position detection device 1 according to the embodiment.

Figure 11:
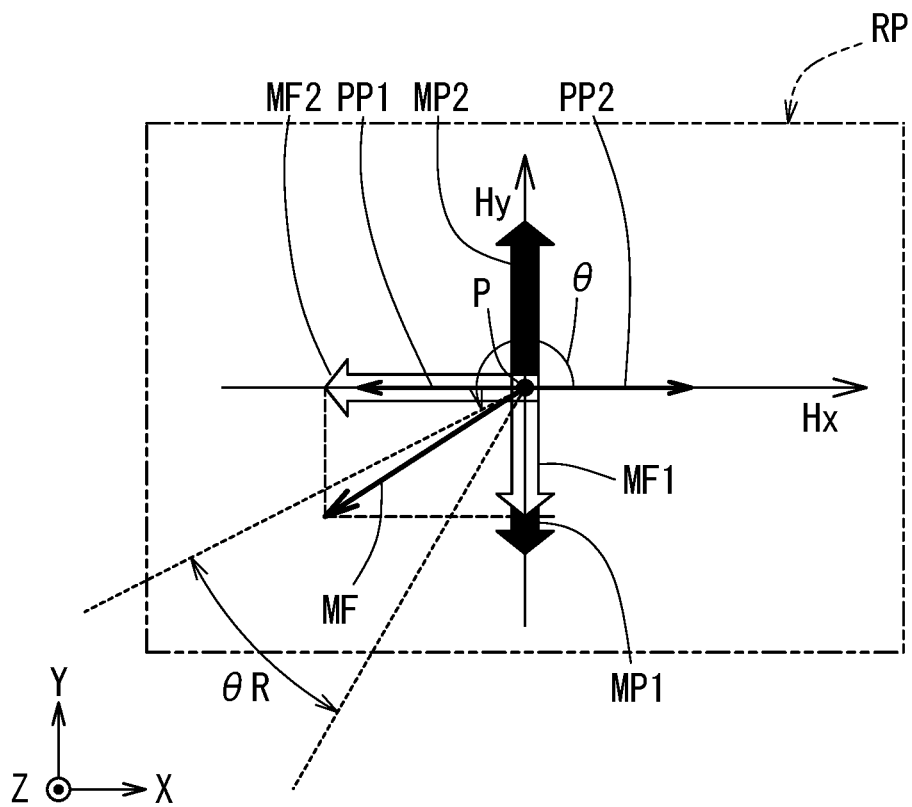
FIG. 11 is an explanatory diagram illustrating the magnetization direction of the magnetization pinned layer and the directions of the first and second magnetic field components in a comparative example.

FIG. 11 is a diagram corresponding to FIG. 9, showing the first and second directions MP1 and MP2 and the first and second magnetic field components MF1 and MF2 of the comparative example. In the comparative example, the direction PP1, which is one of the two directions PP1 and PP2 orthogonal to the magnetization direction of the magnetization pinned layers in the reference plane RP, is the same as the direction of the second magnetic field component MF2, whereas the other direction PP2 is opposite to the direction of the second magnetic field component MF2.

Figure 12:
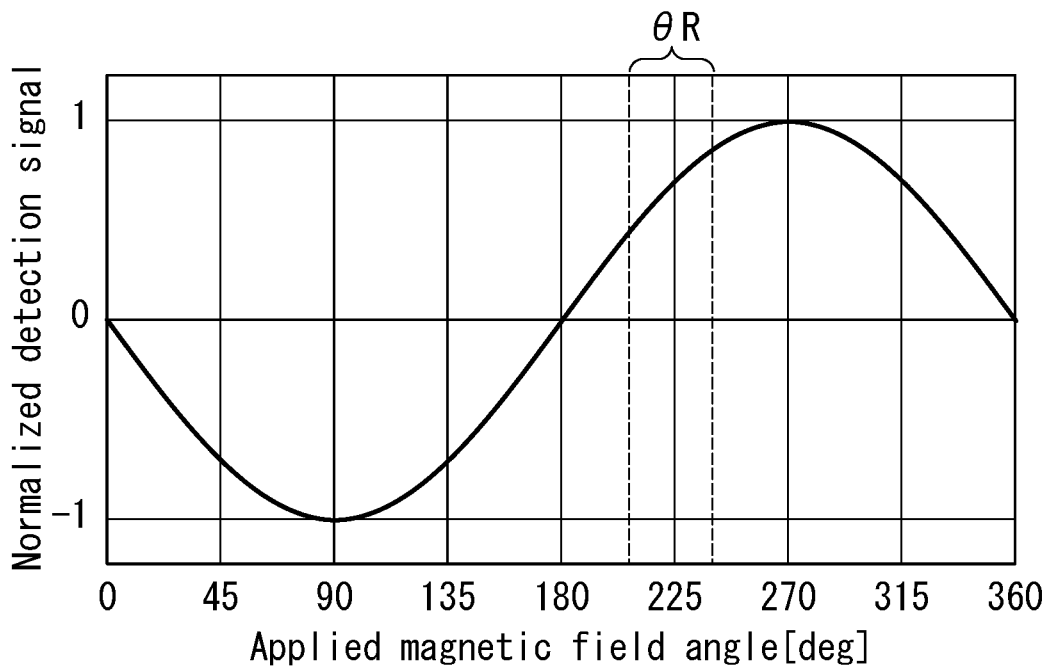
FIG. 12 is a characteristic diagram illustrating the relationship between an applied magnetic field angle and a normalized detection signal in the comparative example.

The position detection device of the comparative example has a drawback as discussed below. Here, for the position detection device 1 according to the embodiment and the position detection device of the comparative example, an angle that any magnetic field applied to the detection position P forms with the reference direction in the reference plane PR will be referred to as an applied magnetic field angle. FIG. 12 is a characteristic diagram illustrating the relationship between the applied magnetic field angle and a normalized detection signal in the comparative example. The normalized detection signal is a detection signal that is normalized such that its maximum value and minimum value when the applied magnetic field angle is varied over a range of 0° to 360° correspond to 1 and −1, respectively. When the potential difference between the first output port E1 and the second output port E2 is 0, the normalized detection signal is 0.

In the comparative example, it is when the direction of the applied magnetic field coincides with one of the two directions PP1 and PP2, in other words, when the applied magnetic field angle is 0° or 180°, that the potential difference between the first output port E1 and the second output port E2 becomes 0.

Here, the degree of linearity of variations in the detection signal with respect to variations in the applied magnetic field angle on a characteristic diagram representing the relationship between the applied magnetic field angle and the normalized detection signal, such as FIG. 12, will be referred to as linearity of detection signal.

In the comparative example, as shown in FIG. 12, the linearity of detection signal is high in a range of the applied magnetic field angle in the vicinity of 0° including 0°, and in a range of the applied magnetic field angle in the vicinity of 180° including 180°. In the comparative example, the linearity of detection signal deteriorates as the applied magnetic field angle approaches 90° or 270°.

FIG. 12 shows the variable range θR of the target angle θ. In the comparative example, the variable range θR does not include 0° or 180°, but is away from 0° or 180°. The linearity of detection signal is thus low in the variable range θR.

In the comparative example, the direction of the target magnetic field MF is different from both of the direction of the first magnetic field component MF1 and the direction of the second magnetic field component MF2, and is between those directions. In the comparative example, the direction PP1, which is one of the two directions PP1 and PP2 orthogonal to the magnetization direction of the magnetization pinned layer in the reference plane PR, coincides with the direction of the second magnetic field component MF2, and the other direction PP2 is opposite to the direction of the second magnetic field component MF2. Accordingly, in the comparative example, the direction of the target magnetic field MF cannot coincide with one of the two directions PP1 and PP2. In other words, in the comparative example the variable range θR cannot include 0° or 180°. Thus, in the comparative example the variable range θR cannot be set in a range in which a high linearity of detection signal is obtained. The comparative example thus has the drawback of being incapable of performing position detection with high accuracy.

Figure 13:
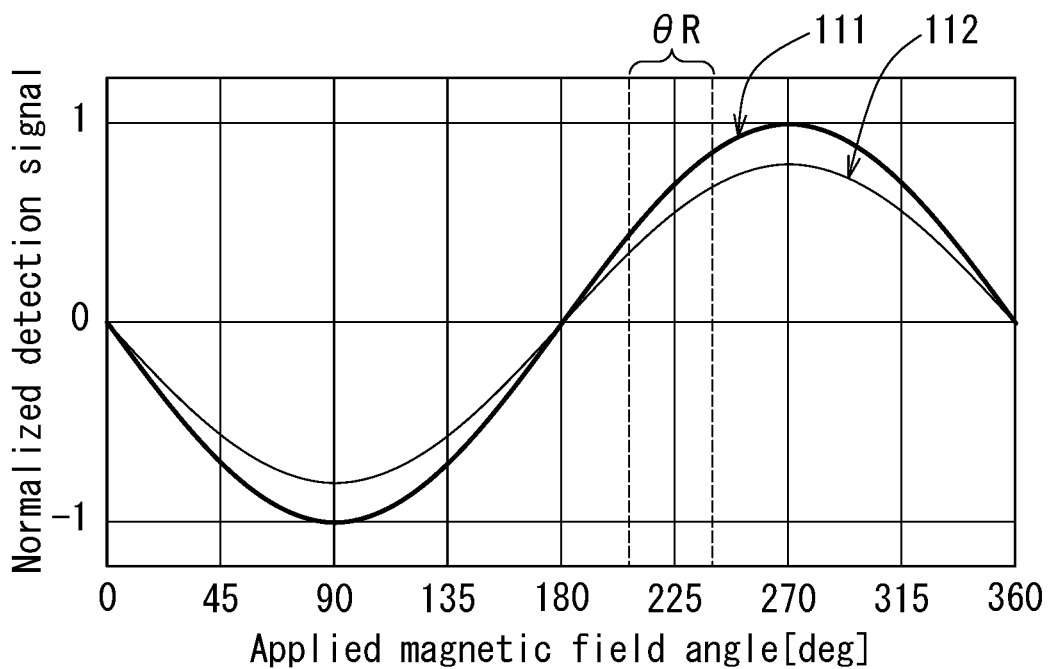
FIG. 13 is a characteristic diagram illustrating variations in the normalized detection signal with varying temperature in the comparative example.

The relative position P12 obtained from the detection signal will be referred to as position detection value. The comparative example has another drawback of having a large error in the position detection value associated with temperature variations. This will be discussed below with reference to FIG. 13. FIG. 13 is a characteristic diagram similar to FIG. 12. In FIG. 13, each of curves 111 and 112 represents the relationship between the applied magnetic field angle and the normalized detection signal for the position detection device of the comparative example. The curve 111 represents the aforementioned relationship at a first temperature, e.g., room temperature. The curve 112 represents the aforementioned relationship at a second temperature higher than the first temperature. The normalized detection signal of the curve 112 has been obtained by multiplying the detection signal at the second temperature by the ratio of the normalized detection signal at the first temperature to the detection signal at the first temperature.

As shown in FIG. 13, the relationship between the applied magnetic field angle and the normalized detection signal varies with varying temperature. In the comparative example, the aforementioned relationship varies largely with temperature variations. The comparative example thus has the drawback that a temperature variation leads to a large error in the position detection value.

The drawbacks of the comparative example described above also hold true when one of the two directions PP1 and PP2 coincides with the direction of the first magnetic field component MF1.

In the position detection device 1 according to the embodiment, the direction of the target magnetic field MF is different from both of the direction of the first magnetic field component MF1 and the direction of the second magnetic field component MF2, and is between those directions. Further, in the embodiment, each of the two directions PP1 and PP2 orthogonal to the magnetization direction of the magnetization pinned layers in the reference plane RP is different from both of the direction of the first magnetic field component MF1 and the direction of the second magnetic field component MF2.

According to the embodiment, it is thus possible to bring one of the two directions PP1 and PP2 closer to the variable range of the direction of the target magnetic field MF than in the comparative example. In other words, according to the embodiment, it is possible that an applied magnetic field angle at which the normalized detection signal is 0 can be brought closer to the variable range θR than in the comparative example. Accordingly, when compared with the comparative example, the embodiment achieves higher detection accuracy of the MR elements, more specifically, higher linearity of detection signal, in the variable range of the direction of the target magnetic field MF, thus enabling position detection with higher accuracy.

To achieve further enhanced accuracy in position detection in the embodiment, the variable range of the direction of the target magnetic field MF preferably includes one of the two directions PP1 and PP2, in other words, the variable range θR preferably includes an applied magnetic field angle at which the normalized detection signal is 0.

To achieve still further enhanced accuracy in position detection in the embodiment, it is more preferable that a direction in the middle of the variable range of the direction of the target magnetic field MF be the same as one of the two directions PP1 and PP2. From the same point of view, it is more preferable that when the relative position P12 is in the middle of the movable range thereof, the direction of the target magnetic field MF be the same as one of the two directions PP1 and PP2.

When the movable range of the relative position P12 is 0 to 0.3 mm and the variable range θR of the target angle θ is 207° to 240° as shown in FIG. 10, the middle of the movable range of the relative position P12 is 0.15 mm. The direction of the target magnetic field MF when the relative position P12 is in the middle of the movable range thereof, and the direction in the middle of the variable range of the direction of the target magnetic field MF are both represented by a target angle θ of 223.5°. In this case, one of the two directions PP1 and PP2 preferably forms an angle within the range of 207° to 240°, more preferably an angle of 223.5°, with the reference direction.

Figure 14:
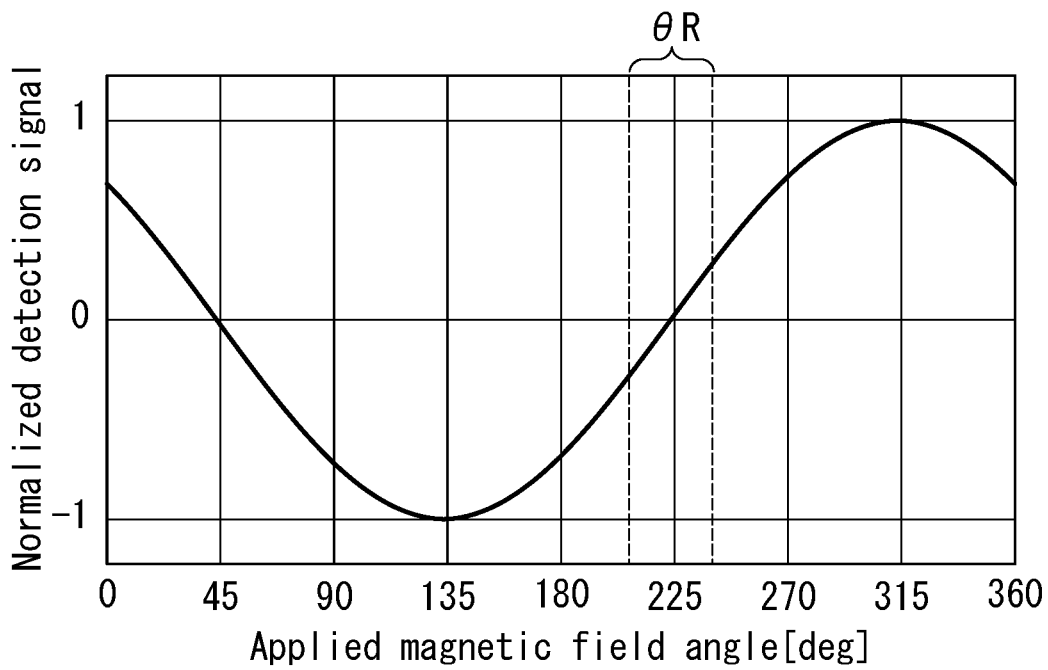
FIG. 14 is a characteristic diagram illustrating the relationship between the applied magnetic field angle and the normalized detection signal in the embodiment of the invention.

FIG. 14 is a characteristic diagram showing an example of the relationship between the applied magnetic field angle and the normalized detection signal for the position detection device 1 according to the embodiment. In this example, the direction PP1 forms an angle of 223.5° with the reference direction.

As is apparent from FIG. 14, according to the embodiment, the variable range θR of the target angle θ can be set at a range in which the linearity of detection signal is high. This allows the magnetic sensor 20 to detect the direction of the target magnetic field MF with high accuracy, thus allowing the position detection device 1 to perform position detection with high accuracy.

Figure 15:
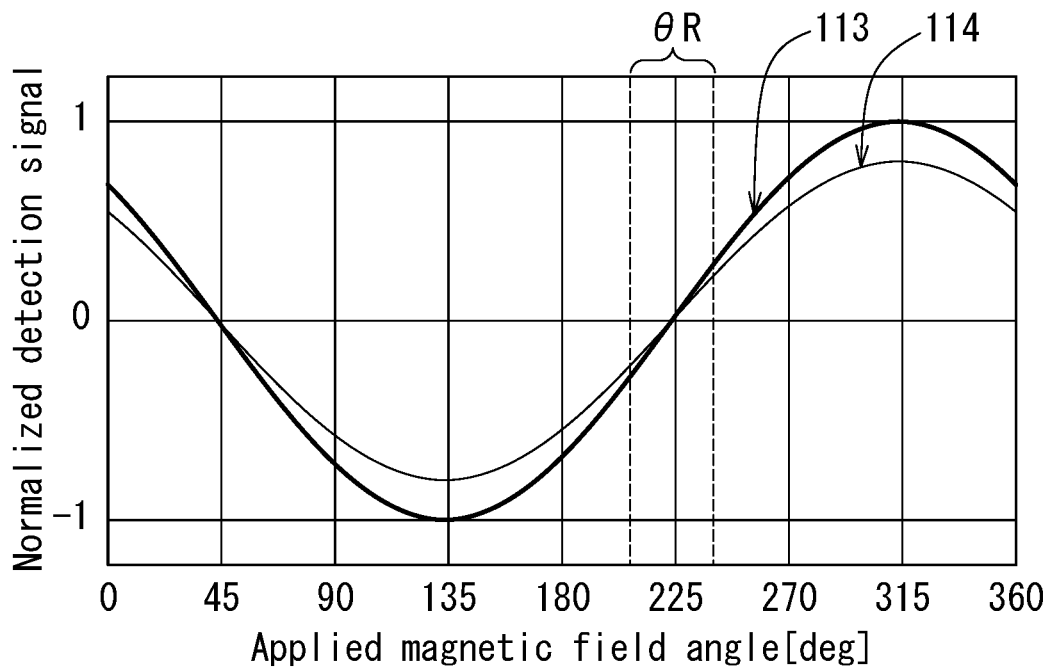
FIG. 15 is a characteristic diagram illustrating variations in the normalized detection signal with varying temperature in the embodiment of the invention.

FIG. 15 is a characteristic diagram similar to FIG. 14. In FIG. 15, each of curves 113 and 114 represents the relationship between the applied magnetic field angle and the normalized detection signal for the position detection device 1 according to the embodiment. The curve 113 represents the aforementioned relationship at a first temperature, e.g., room temperature. The curve 114 represents the aforementioned relationship at a second temperature higher than the first temperature. The normalized detection signal of the curve 114 has been obtained by multiplying the detection signal at the second temperature by the ratio of the normalized detection signal at the first temperature to the detection signal at the first temperature.

In the embodiment, as shown in FIG. 15, the relationship between the applied magnetic field angle and the normalized detection signal less varies with temperature variations in the variable range θR of the target angle θ, as compared with the characteristics of the comparative example shown in FIG. 13. The embodiment thus enables reduction of error in the position detection value associated with temperature variations.

Next, a description will be given of a comparison result for accuracy of position detection between the position detection device 1 according to the embodiment and the position detection device of the comparative example.

Figure 16:
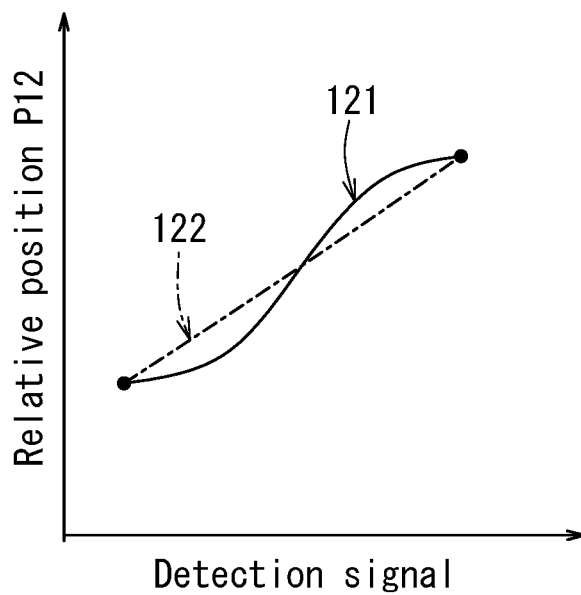
FIG. 16 is an explanatory diagram illustrating a linearity parameter in the embodiment of the invention.

First, with reference to FIG. 16, a description will be given of linearity parameter, i.e., a parameter representing accuracy of position detection. FIG. 16 is a characteristic diagram schematically illustrating the relationship between the detection signal and the relative position P12. In FIG. 16, the horizontal axis represents the detection signal, and the vertical axis represents the relative position P12.

In FIG. 16, the curve 121 represents an example of the relationship between the detection signal and the relative position P12 in the movable range of the relative position P12. The straight line 122 is a line connecting both ends of the curve 121. Here, let Zr represent a relative position P12 on the curve 121 corresponding to any given value of the detection signal, and Zi represent a relative position P12 on the straight line 122 corresponding to the given value of the detection signal. Zr—Zi is defined as the value of the linearity parameter L corresponding to Zi. The smaller the absolute value of the linearity parameter L throughout the movable range of the relative position P12, the higher accuracy in position detection is obtained.

Figure 17:
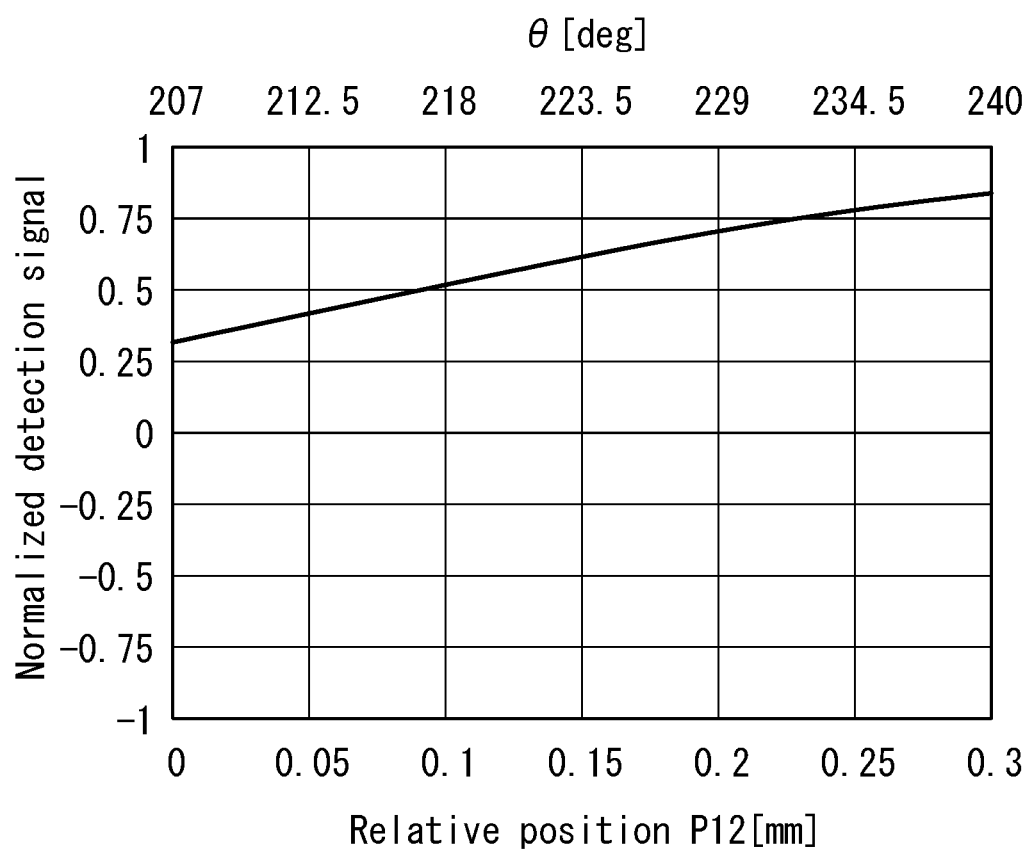
FIG. 17 is a characteristic diagram illustrating the relationship of the relative position P12 and the target angle with the normalized detection signal in the comparative example.

FIG. 17 is a characteristic diagram illustrating the relationship of the relative position P12 and the target angle θ with the normalized detection signal in the comparative example. In FIG. 17 the horizontal axes represent the relative position P12 and the target angle θ, and the vertical axis represents the normalized detection signal.

Figure 18:
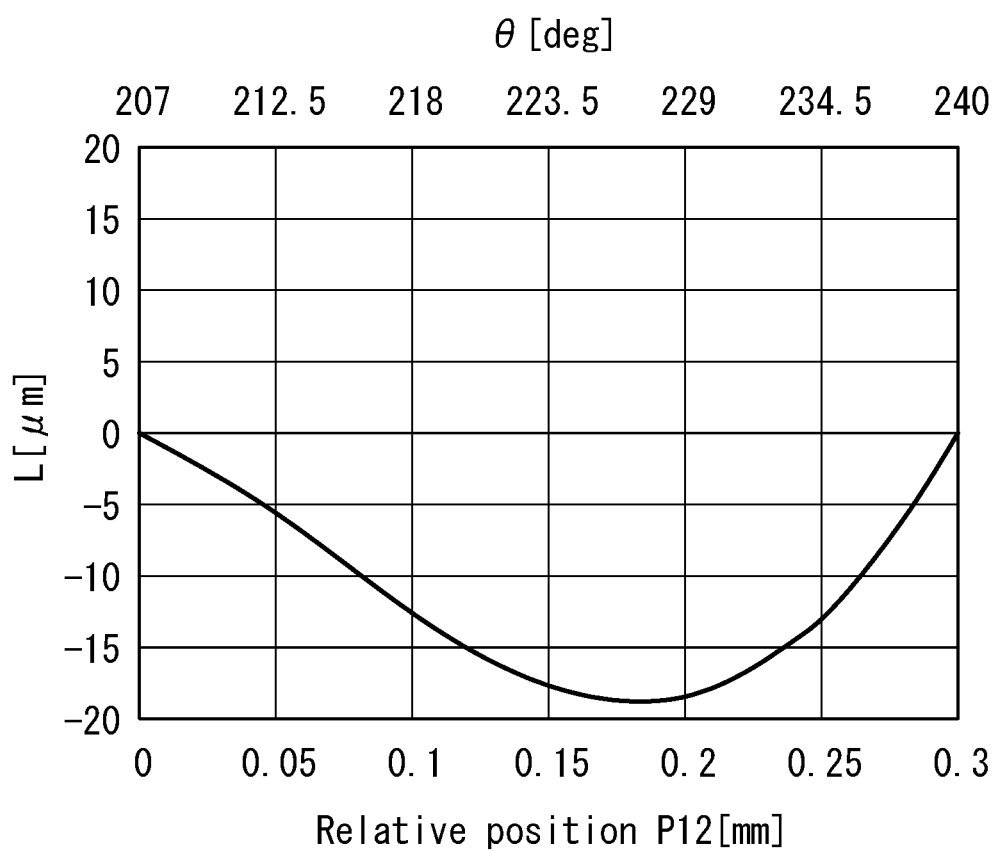
FIG. 18 is a characteristic diagram illustrating the relationship of the relative position P12 and the target angle with the linearity parameter in the comparative example.

FIG. 18 is a characteristic diagram illustrating the relationship of the relative position P12 and the target angle θ with the linearity parameter L in the comparative example. In FIG. 18 the horizontal axes represent the relative position P12 and the target angle θ, and the vertical axis represents the linearity parameter L.

Figure 19:
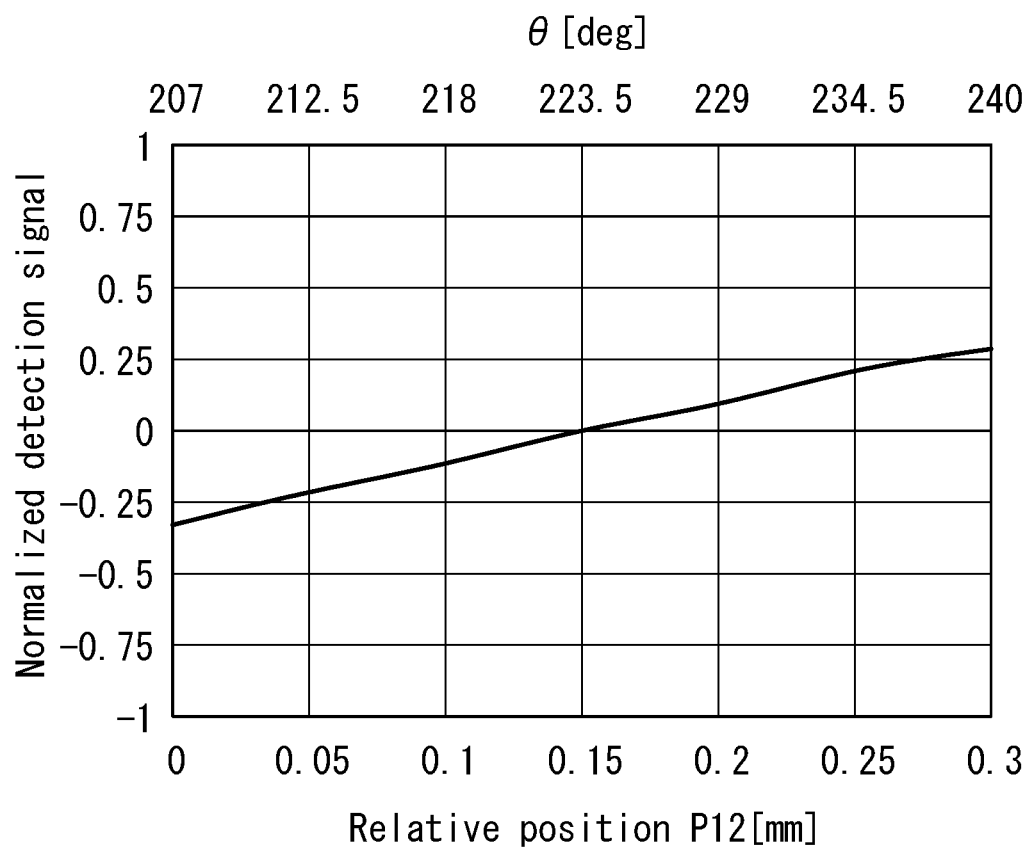
FIG. 19 is a characteristic diagram illustrating the relationship of the relative position P12 and the target angle with the normalized detection signal in the embodiment of the invention.

FIG. 19 is a characteristic diagram illustrating the relationship of the relative position P12 and the target angle θ with the normalized detection signal in the embodiment. In FIG. 19 the horizontal axes represent the relative position P12 and the target angle θ, and the vertical axis represents the normalized detection signal.

Figure 20:
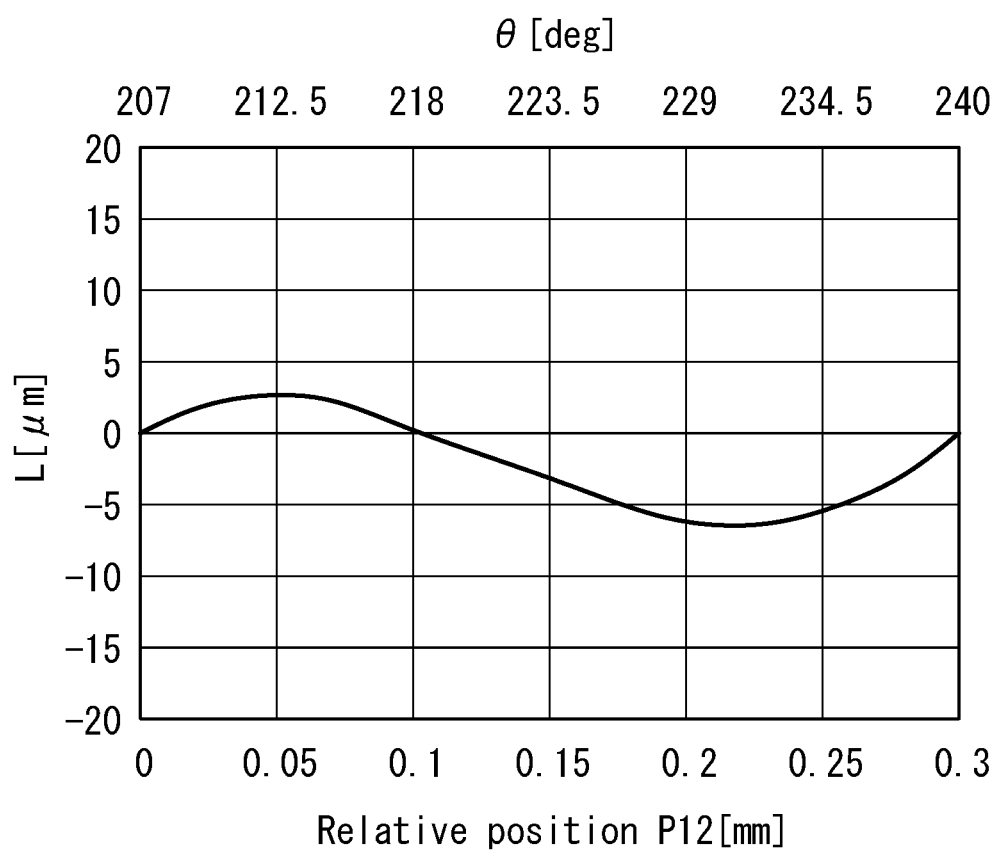
FIG. 20 is a characteristic diagram illustrating the relationship of the relative position P12 and the target angle with the linearity parameter in the embodiment of the invention.

FIG. 20 is a characteristic diagram illustrating the relationship of the relative position P12 and the target angle θ with the linearity parameter L in the embodiment. In FIG. 20 the horizontal axes represent the relative position P12 and the target angle θ, and the vertical axis represents the linearity parameter L.

As is apparent from comparison between FIGS. 18 and 20, the absolute value of the linearity parameter L is smaller throughout the movable range of the relative position P12 in the embodiment than in the comparative example. This indicates that the embodiment is capable of performing position detection with high accuracy.

The present invention is not limited to the foregoing embodiment, and various modifications may be made thereto. For example, as far as the requirements of the appended claims are met, the shapes and locations of the first and second magnetic field generation units and the location of the magnetic sensor 20 are not limited to the respective examples illustrated in the foregoing embodiment, but can be freely chosen.

Further, as far as the requirements of the appended claims are met, the directions of the first and second magnetic field components may be freely chosen. For example, the first magnetic field component may be in the Y or −Y direction, and the second magnetic field component may be in the Z or −Z direction. In such a case, the reference plane is a plane perpendicular to the X direction.

Further, the magnetic sensor 20 may be configured without the Wheatstone bridge circuit 21 and the difference detector 22. For example, the magnetic sensor 20 may be configured to include the power supply port V, the ground port G the first output port E1, and the first and second resistor sections R1 and R2, and include none of the second output port E2, the third and fourth resistor sections R3 and R4, and the difference detector 22. In such a case, the detection signal is a signal dependent on the electric potential at the first output port E1.

The position detection device of the present invention is usable to detect not only a lens position but also the position of any object moving in a predetermined direction.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiment.

What is claimed is:

1. A magnetic sensor for generating, at a detection position in a reference plane, a detection signal corresponding to a direction of a detection-target magnetic field that varies within a variable range below 90° in the reference plane, comprising at least one magnetoresistive element, wherein
   the at least one magnetoresistive element, which is a tunnel magnetoresistive element or a giant magnetoresistive element, includes a magnetization pinned layer having a magnetization whose direction is fixed, and a free layer having a magnetization whose direction is variable according to the direction of the detection-target magnetic field,
   the reference plane is a plane that contains the direction of the magnetization of the magnetization pinned layer and the direction of the detection-target magnetic field, and
   one of two directions (1) orthogonal to the direction of the magnetization of the magnetization pinned layer and (2) in the reference plane is contained in the variable range of the direction of the detection-target magnetic field.

2. The magnetic sensor according to claim 1, wherein the one of the two directions orthogonal to the direction of the magnetization of the magnetization pinned layer is the same as a direction in the middle of the variable range of the direction of the detection-target magnetic field.

3. The magnetic sensor according to claim 1, wherein
   the at least one magnetoresistive element is at least one first magnetoresistive element and at least one second magnetoresistive element,
   the magnetic sensor further includes a power supply port configured to receive a predetermined voltage, a ground port connected to a ground, and an output port,
   the at least one first magnetoresistive element is provided between the power supply port and the output port,
   the at least one second magnetoresistive element is provided between the output port and the ground port,
   the magnetization of the magnetization pinned layer of the at least one first magnetoresistive element is in a first direction,
   the magnetization of the magnetization pinned layer of the at least one second magnetoresistive element is in a second direction opposite to the first direction, and
   the detection signal depends on an electric potential at the output port.

4. The magnetic sensor according to claim 1, wherein
   the at least one magnetoresistive element is at least one first magnetoresistive element, at least one second magnetoresistive element, at least one third magnetoresistive element, and at least one fourth magnetoresistive element,
   the magnetic sensor further includes a power supply port configured to receive a predetermined voltage, a ground port connected to a ground, a first output port, and a second output port,
   the at least one first magnetoresistive element is provided between the power supply port and the first output port,
   the at least one second magnetoresistive element is provided between the first output port and the ground port,
   the at least one third magnetoresistive element is provided between the power supply port and the second output port,
   the at least one fourth magnetoresistive element is provided between the second output port and the ground port,
   the magnetization of the magnetization pinned layer of the at least one first magnetoresistive element and the magnetization of the magnetization pinned layer of the at least one fourth magnetoresistive element are in a first direction,
   the magnetization of the magnetization pinned layer of the at least one second magnetoresistive element and the magnetization of the magnetization pinned layer of the at least one third magnetoresistive element are in a second direction opposite to the first direction, and
   the detection signal depends on a potential difference between the first output port and the second output port.

5. A position detection device comprising the magnetic sensor according to claim 1, the position detection device further comprising:
   a first magnetic field generation unit for generating a first magnetic field;
   a second magnetic field generation unit for generating a second magnetic field, the second magnetic field generation unit being provided such that its position relative to the first magnetic field generation unit is variable;
   a first holding member for holding the first magnetic field generation unit; and
   a second holding member for holding the second magnetic field generation unit, the second holding member being provided such that its position is variable in one direction relative to the first holding member.

6. The position detection device according to claim 5, wherein
   the detection-target magnetic field is a composite magnetic field of a first magnetic field component of the first magnetic field and a second magnetic field component of the second magnetic field.

7. The position detection device according to claim 5, wherein the second holding member is configured to hold a lens, and is provided such that its position is variable in a direction of an optical axis of the lens relative to the first holding member.

8. The position detection device according to claim 5, wherein when the position of the second magnetic field generation unit relative to the first magnetic field generation unit varies, a strength of a second magnetic field component varies whereas none of a strength and direction of a first magnetic field component and a direction of the second magnetic field component vary, where the first magnetic field component is a component of the first magnetic field at the detection position, the component of the first magnetic field being parallel to the reference plane, and the second magnetic field component is a component of the second magnetic field at the detection position, the component of the second magnetic field being parallel to the reference plane.

9. The position detection device according to claim 8, wherein the detection-target magnetic field is a composite magnetic field of the first magnetic field component of the first magnetic field and the second magnetic field component of the second magnetic field.

* * * * *